(12) United States Patent
Kim et al.

(10) Patent No.: US 8,504,113 B2
(45) Date of Patent: Aug. 6, 2013

(54) MOBILE TERMINAL

(75) Inventors: Jeongho Kim, Anyang-si (KR); Anna Yoo, Daegu (KR); Soowook Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/411,459

(22) Filed: Mar. 2, 2012

(65) Prior Publication Data

US 2012/0252534 A1  Oct. 4, 2012

(30) Foreign Application Priority Data

Mar. 28, 2011  (KR) ........................ 10-2011-0027756

(51) Int. Cl.
*H04B 1/38* (2006.01)
*H01L 29/06* (2006.01)
*H01L 33/00* (2010.01)
*H01J 1/62* (2006.01)
*F21V 7/04* (2006.01)
*G02F 1/1335* (2006.01)

(52) U.S. Cl.
USPC ............ 455/566; 257/13; 313/504; 362/615; 362/555; 349/61

(58) Field of Classification Search
USPC ........................................................ 455/566
See application file for complete search history.

(56) References Cited

U.S. PATENT DOCUMENTS

| | | | |
|---|---|---|---|
| 2005/0146652 A1* | 7/2005 | Yokoyama et al. | 349/61 |
| 2007/0057629 A1* | 3/2007 | Lee | 313/504 |
| 2010/0110728 A1* | 5/2010 | Dubrow et al. | 362/615 |
| 2010/0273530 A1* | 10/2010 | Jarvis et al. | 455/566 |
| 2011/0309325 A1* | 12/2011 | Park et al. | 257/13 |

* cited by examiner

*Primary Examiner* — Timothy Pham
(74) *Attorney, Agent, or Firm* — Lee, Hong, Degerman, Kang & Waimey

(57) ABSTRACT

A mobile terminal is disclosed, by which color reproducibility of a display and the expected life span of a display can be enhanced using quantum dots. The present invention may include a display panel, a plurality of light source units provided under the display panel by being spaced apart from each other, and a fluorescent unit provided to a light emission surface of the light source unit entirely or in part. Moreover, the fluorescent unit may include a quantum dot for transforming a light incident from the light source unit into R light entirely or in part.

14 Claims, 10 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2011-0027756, filed on Mar. 28, 2011, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for improving color reproducibility of a display using quantum dots and enhancing the expected life span of the display.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

As functions of the terminal tend to be diversified, the terminal is implemented as a multimedia player type equipped with composite functions including picture or video photographing, music or video file playback, games, broadcast reception and the like for example.

In order to support and increase functions of the terminal, modification of structural portions and/or software portions thereof may be taken into consideration.

Currently, owing to debut of an AMOLED (Active Matrix Organic Light Emitting Diode), the color gamut (A ratio of accuracy of color reproduction to a recorded picture according to NTSC broadcasting standards) can be improved up to 100%. However, the AMOLED display has problems in that a production cost is high, a lifetime is short due to use of organic RGB materials, and brightness is low.

SUMMARY OF THE INVENTION

Accordingly, the present invention is directed to a mobile terminal that substantially obviates one or more problems due to limitations and disadvantages of the related art.

An object of the present invention is to provide a mobile terminal, by which color reproducibility of a display may be improved with a lower manufacturing cost.

Another object of the present invention is to provide a mobile terminal, by which color reproducibility of a display may be improved using a configuration of a conventional LCD.

A further object of the present invention is to provide a mobile terminal, by which the expected life span of a display may be enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a display panel, a plurality of light source units provided under the display panel by being spaced apart from each other, and a fluorescent unit provided to a light emission surface of the light source unit entirely or in part. Moreover, the fluorescent unit may include a quantum dot for transforming a light incident from the light source unit into R light entirely or in part.

Accordingly, the present invention provides the following effects and/or advantages.

First of all, the present invention may improve color reproducibility of a display with a manufacturing cost lower than that of AMOLED.

Secondly, the present invention may improve color reproducibility of a display using a configuration of a conventional LCD display.

Thirdly, the present invention may enhance the expected life span of a display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The mobile terminal described in the specification can include cellular phone, smart phone, laptop computer, digital broadcasting terminal, PDA (Personal Digital Assistants), PMP (Portable Multimedia Player), navigation and so on. However, it will be apparent of to persons in this field of art that a configuration of the embodiment described in the specification is applicable to stationary terminals, such as digital TV and desk top computer, if cases are excluded, in which the embodiment is applicable only to the mobile terminal.

Figure 1:
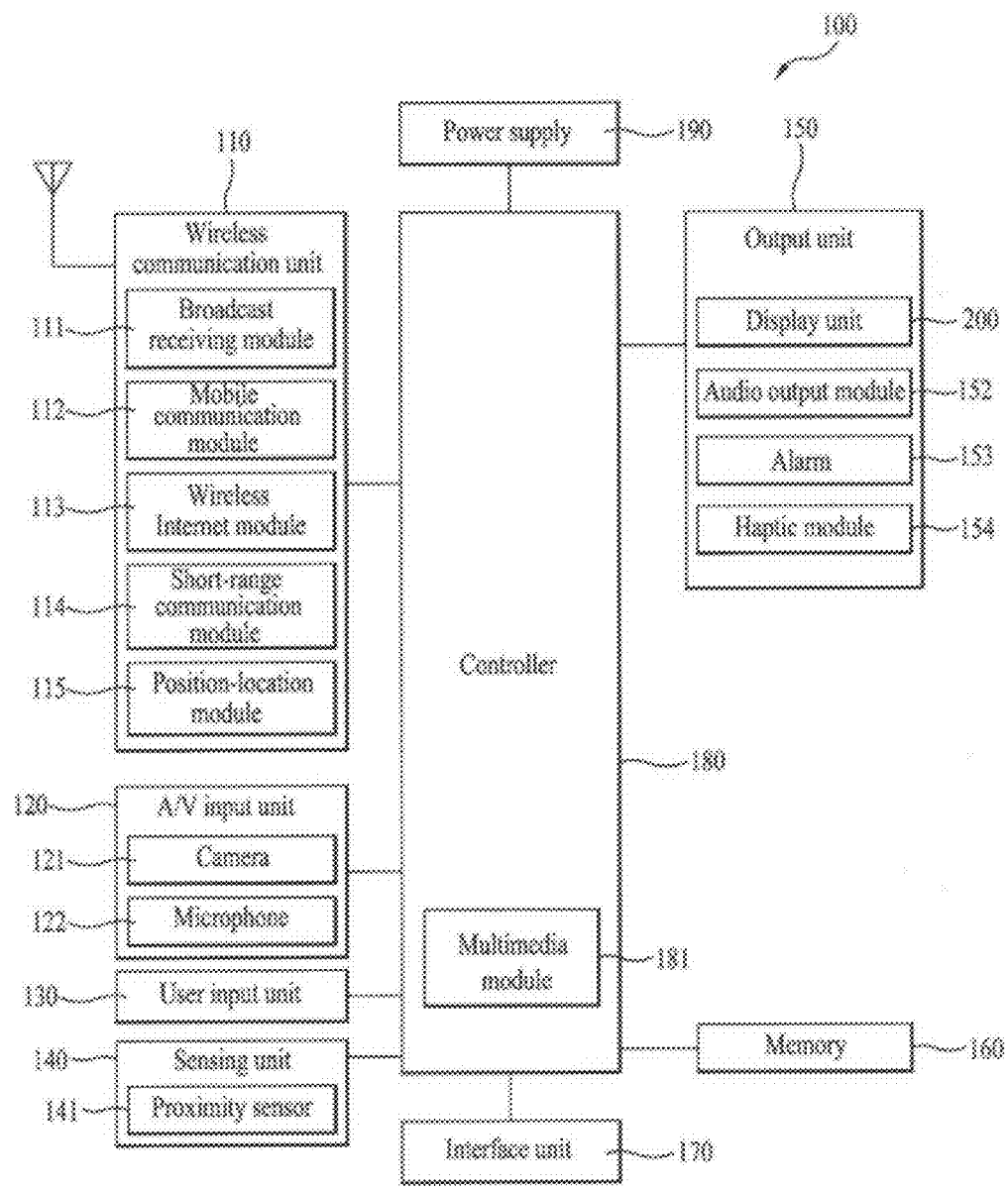
FIG. 1 is a block diagram of a mobile terminal in accordance with an embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Elements of the present invention will be described one by one.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 200.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

The sensing unit 140 detects such a current configuration of the mobile terminal 100 as an open/closed configuration of the mobile terminal 100, a location of the mobile terminal 100, a presence or non-presence of user contact, and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

Meanwhile, the sensing unit 140 may include a proximity sensor 141.

The output unit 150 is configured to output an audio signal, a video signal and/or an alarm signal. And, the output unit 150 may include the display 200, an audio output module 152, an alarm output module 153, a haptic module 154 and the like.

The display 200 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 200 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can have a transparent or light-transmitting configuration to be externally viewable therethrough. And, such a display can be called a light-transmitting display. TOLED (transparent OLED), AMOLED (active matrix OLED) and the like are representative examples of the light-transmitting displays. And, a rear structure of the display can have the light-transmitting configuration as well. Above structure enables the user to see things positioned in rear of a terminal body through a region of the display unit 200 of the terminal body occupies.

According to an implementation type of the mobile terminal 100, at least two displays 200 can exist in the mobile terminal 100. For instance, a plurality of displays can be arranged on one face of the mobile terminal 100 in a manner of being spaced apart from each other or being built in one body. For another instance, a plurality of displays can be arranged on different faces of the mobile terminal 100, respectively.

In case that the display 200 and a sensor for detecting a touch action (hereinafter called 'touch sensor') of such a pointer as a user's finger, a pen and the like configures a mutual layer structure (hereinafter called 'touchscreen'), it is able to use the display 200 as an input device as well as an output device. In this case, the touch sensor can be configured with a touch film, a touch sheet, a touchpad or the like for example.

The touch sensor can be configured to convert a pressure applied to a specific portion of the display 200 or a variation of a capacitance generated from a specific portion of the display 200 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know which portion of the display 200 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 200 or the audio output unit 152. Hence, the display 200 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen.

The memory 160 may include at least one storage medium of such a type as a flash memory type, a hard disk type, a multimedia card micro type, a card type memory (e.g., SD memory, XD memory, etc.), RAM, SRAM (Static Random Access Memory), ROM, EEPROM (Electrically Erasable Programmable Read-Only Memory), PROM (Programmable Read-Only Memory) and the like. Moreover, the mobile terminal 100 is able to operate a web storage that performs a storage function of the memory 160 on internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 is able to perform a pattern recognizing processing for recognizing a handwriting input or a drawing input performed on the touchscreen into a character and an image, respectively.

The power supply 190 receives an external and/or internal power source and then supplies power required for operations of the respective components, under the control of the controller 180.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 2A:
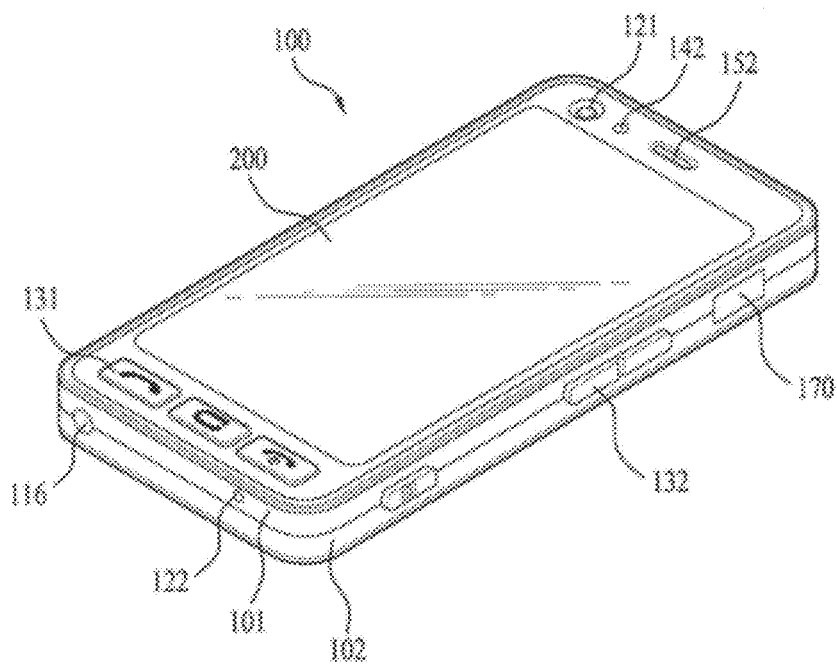
FIG. 2A illustrates a front perspective view of a mobile terminal related to a preferred embodiment of the present invention.

FIG. 2A illustrates a front perspective view of a mobile terminal related to a preferred embodiment of the present invention.

The mobile terminal 100 disclosed herein has a bar type terminal body. However, the present invention is not limited to this, but is applicable to various types of structures of the mobile terminal, such as a slide type, a folder type, a swing type, a swivel type and so on, in which two or more than two bodies are coupled to allow relative motions.

The body includes a case (casing, housing, cover, and so on) which forms an exterior thereof. In the embodiment, the case includes a front case 101 and a rear case 102. Various electronic components are mounted in a space formed between the front case 101 and the rear case 102. There can be at least one intermediate case between the front case 101 and the rear case 102, additionally.

The cases can be injection moldings of synthetic resin or formed of a metal, such as stainless steel or titanium Ti.

The terminal body, mostly the front case 101, can have a display unit 200, a sound output unit 152, a camera 121, user input units 130/131 and 132, a microphone 122, an interface 170 arranged thereon.

The display unit 200 occupies most of a main surface of the front case 101. The sound output unit 152 and the camera 121 are arranged at a region adjacent to one end of the display unit 200 and the user input unit 132 and the microphone 122 are arranged at a region adjacent to the other end of the display unit 200. The user input unit 132 and the interface 170 can be arranged at sides of the front case 101 and the rear case 102.

The user input unit 130, to be handled for receiving an order to control operation of the mobile terminal 100, can include a plurality of handling units 131 and 132. The handling units 131 and 132, called as a handling portion collectively, can be of any type as far as it can be handled in a tactile manner. Contents to be received by the first and second handling units 131 and 132 can be set in a variety of ways. For an example, the first handling unit 131 can receive orders, such as start, end and scroll, and the second handling unit 132 can receive orders such as control of sound volume from the sound output unit 152, and shifting to a touch sensing mode of the display unit 200, and so on.

Figure 2B:
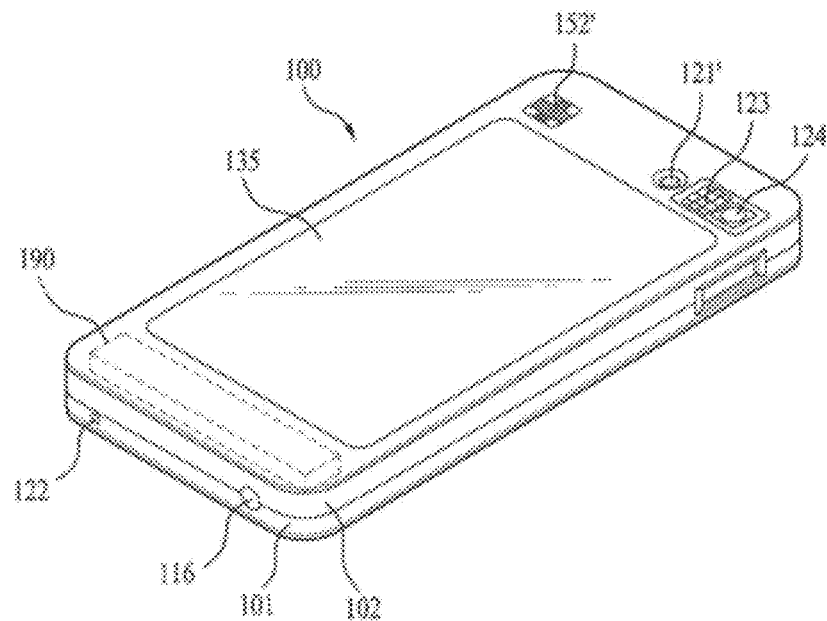
FIG. 2B illustrates a back side perspective view of a mobile terminal related to a preferred embodiment of the present invention.

FIG. 2B illustrates a backside perspective view of a mobile terminal shown in FIG. 2A.

Referring to FIG. 2B, a camera 121' can be mounted to a backside of the terminal body, i.e., on the rear case 102, additionally. The camera 121' has a picture taking direction opposite to the camera 121 (See FIG. 2) actually, and can be a camera having pixels different from the camera 121.

For an example, it is preferable that the camera 121 has low density of pixels such that taking and transmitting a picture of a face of the user to an opposite side can be done properly, and the camera 121' has high density of pixels since there are many cases when the camera 121' takes a general object and stores the picture without transmission directly. The cameras 121 and 121' can be mounted to the terminal body, rotatably or able to pop-up.

A flash 123 and a mirror 124 are arranged adjacent to the camera 121', additionally. The flash 123 illuminates the object when the camera 121' takes the object. The mirror 124 enables the user to see the user's face or so on when the user takes a picture of the user with the user's camera 121'.

A sound output unit 152' can be mounted to the backside of the terminal body, additionally. The sound output unit 152' can implement a stereo function together with the sound output unit 152 (See FIG. 2A), and can be used for implementing a speaker phone mode.

Besides an antenna for communication, the terminal body at a side thereof can have a broadcasting signal reception antenna 124, additionally. The antenna 124 in the broadcast receiving module 111 (See FIG. 1) can be mounted to be able to pull out of the terminal body.

The terminal body has a power supply unit 190 mounted thereto for supplying power to the mobile terminal 100. The power supply unit 190 can be built-in the terminal body or detachably mounted to an outside of the terminal body.

The rear case 102 can have a touch pad 135 mounted thereto additionally for sensing a touch thereto. Alike the display unit 200, the touch pad 135 can also be a light transmission type. In this case, if the display unit 200 is configured to provide visual information to both sides of the display unit 200, the visual information can be sensed through the touch pad 135. All information to be provided to the both sides can be controlled by the touch pad 135. Different from this, a display unit can be mounted to the touch pad 135 additionally, to arrange a touch screen on the rear case 102, too.

The touch pad 135 is operative in relation to the display unit 200 on the front case 101. The touch pad 135 can be arranged in rear of the display unit 200 in parallel thereto. The touch pad 135 can have a size the same or smaller than the display unit 200.

For conveniences' sake, it is assumed that the mobile terminal 100 described below includes at least one of elements shown in FIG. 1. Particularly, the mobile terminal having the present invention applicable thereto includes a display unit 200, a controller 180 for controlling the display unit 200, and a power supply unit 190 for supplying power to the mobile terminal.

Figure 3:
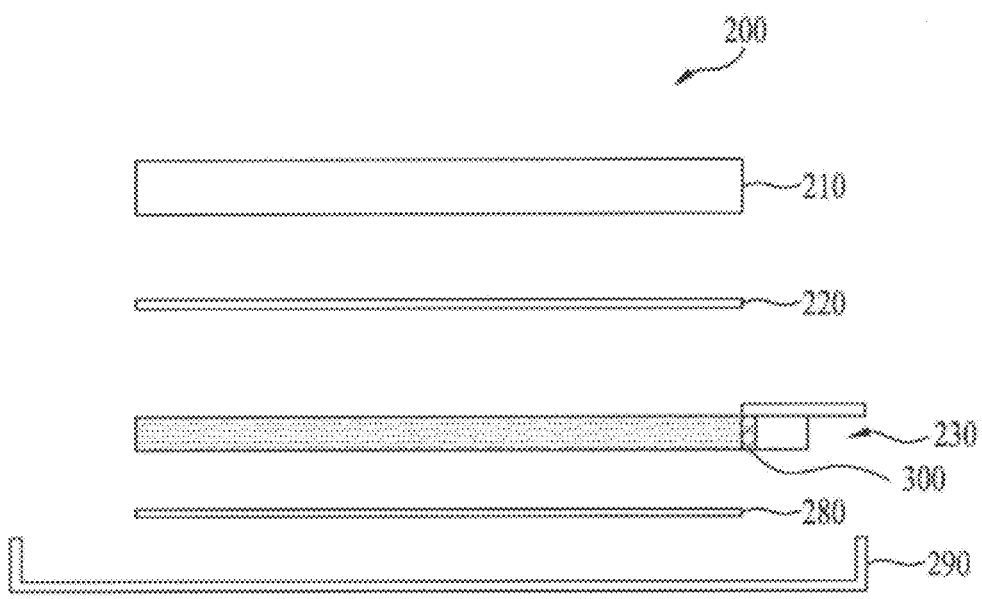
FIG. 3 is a schematic exploded perspective diagram of a display unit in a mobile terminal according to one embodiment of the present invention.

FIG. 3 illustrates an exploded side view of a display unit 200 of a mobile terminal related to a preferred embodiment of the present invention, schematically. Referring to FIG. 3, the display unit 200 includes a display panel 210 (e.g., liquid crystal panel), a diffuser sheet 220 arranged under the display panel 210, a back light unit BLU 230 arranged under the diffuser sheet 220 for providing a light to the display panel 210, a reflector sheet 280 arranged under the back light unit 230 for reflecting the light from the back light unit 230, a frame 290 arranged under the reflector sheet 280 for supporting above elements.

Figure 4:
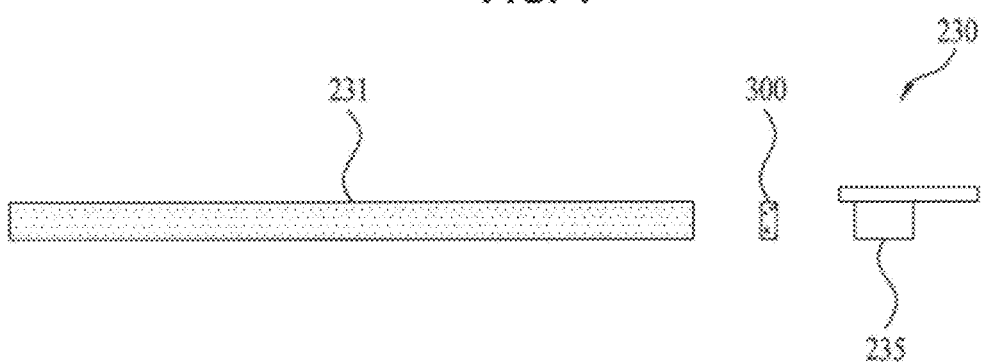
FIG. 4 is a schematic exploded perspective diagram of a backlight unit in a mobile terminal according to one embodiment of the present invention.
Figure 5:
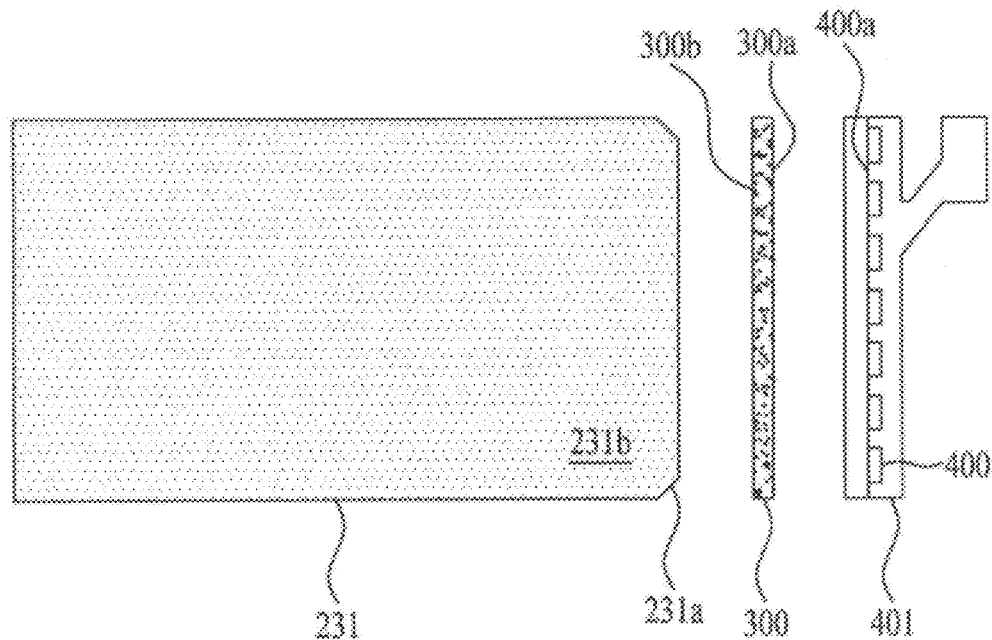
FIG. 5 is a schematic exploded layout of a backlight unit in a mobile terminal according to one embodiment of the present invention.

FIGS. 4 and 5 illustrate the back light unit 230 of the present invention, schematically. In general, in the back light unit 230 of the display panel 210 (e.g., LCD), there are a direct lighting type in which a light source is arranged on an entire rear surface of the display panel 210, and an edge lighting type in which the light source is arranged on an edge of the display panel 210. The back light unit 230 of the present invention is the edge lighting type back light unit which is used in the mobile terminal for reducing a thickness of the display unit 200.

Referring to FIGS. 4 and 5, the back light unit 230 of the present invention may include a light guide plate (LGP) 231 arranged under the display panel 210, a fluorescent unit 300 provided to one edge of a lateral side of the light guide plate 231 to emit lights of R (red), G (green) and B (blue), and a light source supporter 401 at a side of the fluorescent unit 300 for supporting a plurality of light source units 236. Preferably, the light guide plate 231, the fluorescent unit 300 and the light source supporter 401 are bonded with light transmissive resin to one another.

Referring to FIG. 5, the light guide plate 231 includes a light incident surface 231a for receiving the light from the light source unit 400, and a light emission surface 231b for emitting the light to the display panel 210, and the light incident surface 231a and the light emission surface 231b are perpendicular to each other. And, in order to maintain uniformity of a screen of the display panel 210, the light guide plate 231 has concentration of a light scattering agent which becomes the heavier as the light guide plate 231 goes from one side thereof close to the light source unit 400 (i.e., a light incident surface side) to the other side thereof spaced from the light guide plate 231 the more for making the light to diffuse at the screen of the display panel 210 uniformly to produce a bright and clear image.

Figure 14:
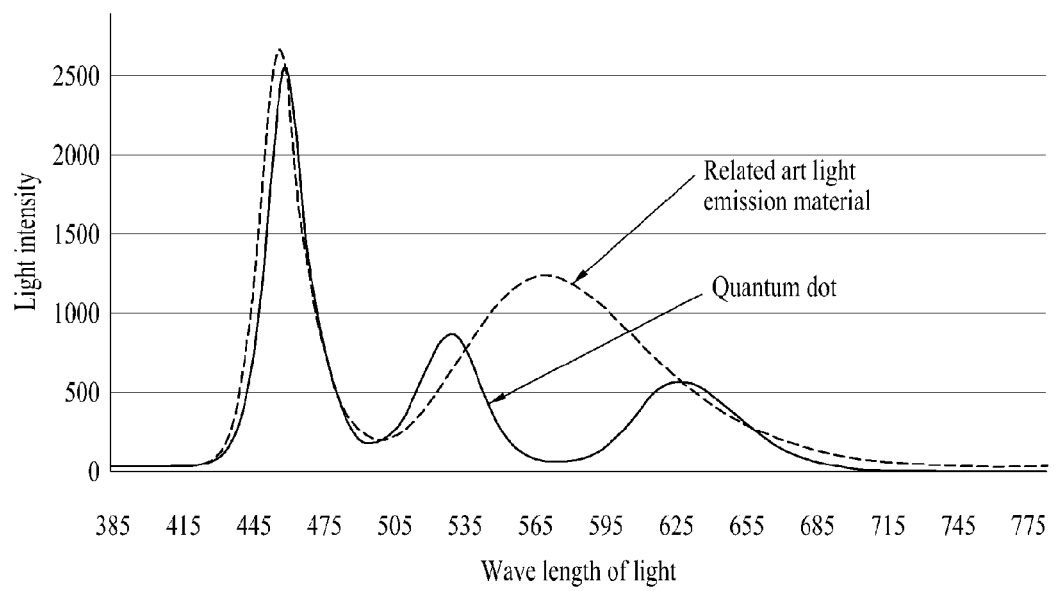
FIG. 14 is a graph of light intensity of quantum dot and related art light emission material.

Referring to FIG. 5, the fluorescent unit 300 may include a light emitting filter filled with R fluorescent material, G fluorescent material and B fluorescent material as light emitting materials or a light emitting filter filled with quantum dots fully or in part. The fluorescent unit 300 may include a light input surface 300a and a light output surface 300b. In particular, the light provided by the light source unit 400 may be inputted to the light input surface 300a and may be then outputted from the light output surface 300b. The quantum dots in the fluorescent unit 300, which are the nano-sized semiconductor material having a quantum confinement effect, may have the property of generating a stronger light within a narrow wavelength band than a related art light emission material (Refer to FIG. 14).

And, light emission from the quantum dot, which takes place as an excited electron transits from a conduction band to a valence band, has a characteristic in which the wave length varies with a size of particle even in a case of the same material. In detail, because the quantum dot emits a light having a wave length which is the shorter (a blue color group) as a size of the quantum dot becomes the smaller, a light of a desired wave length band can be obtained by controlling the size of the quantum dot. Since the quantum dot emits the light even if an excitation wave length is selected in random, if many kinds of the quantum dots are excited with one wave length, many colors of light can be observed at a time. Moreover, since the quantum dot transits from a ground vibration state of the conduction band to a ground vibration state of the valence band only, almost of the light emitted from the quantum dot is a single color light. Owing to those characteristics of the quantum dot, colors on the display can be made clear, and brightness can also be increased significantly compared to the AMOLED.

Eventually, by using the fluorescent unit 300 filled totally or partially by the quantum dots, the present invention can improve the color gamut more than 100% like the AMOLED even if a production cost is lower than the AMOLED, and can improve the brightness compared to the AMOLED owing to the characteristics of the quantum dot that emits a strong light within a narrow wave length band. A structure and a shape of the fluorescent unit 300 will be described in more detail.

In the following description, for clarity and convenience of the following description and to avoid redundant description, a quantum dot having a prescribed $1^{st}$ size to enable a light incident from a light source unit to be transformed into a red (R) light may be named a red quantum dot, a quantum dot having a $2^{nd}$ size smaller than the $1^{st}$ size to enable a light incident from a light source unit to be transformed into a green (G) light may be named a green quantum dot, and a quantum dot having a $3^{rd}$ size smaller than the $2^{nd}$ size to enable a light incident from a light source unit to be transformed into a blue (B) light may be named a blue quantum dot.

The light source supporter 401 has one side connected to a side of the fluorescent unit 300 (i.e., a side positioned on a light incident surface 300a side of the fluorescent unit 300), and the other side connected to the power supply unit 190. As shown in FIG. 4, the light source supporter 401 contains the plurality of light source units 236 spaced from one another, and each of the light source units 236 has a light emission surface 400a for emitting a light therefrom. Preferably, the light source unit 400 is an LED device, and more preferably, the light source unit 400 is a blue LED or an UV LED.

Regarding the light emitting process of the backlight unit 230, the light generated from the light source unit 400 of an LED device is emitted from a light emitting surface 236a of the light source unit 400 and is then inputted to the light input surface 300a of the fluorescent unit 300 to be transformed into R, G, and B lights of strong lights on a narrow wavelength band by the R, G, and B fluorescent materials or the quantum dots. The R, G, and B lights are outputted from the light output surface 300b to enter the light incident surface 231a of the light guide plate 231. In the following description, an assembly including the light source unit 400 and the fluorescent unit 300 may be named a light emitting module.

Figure 6:
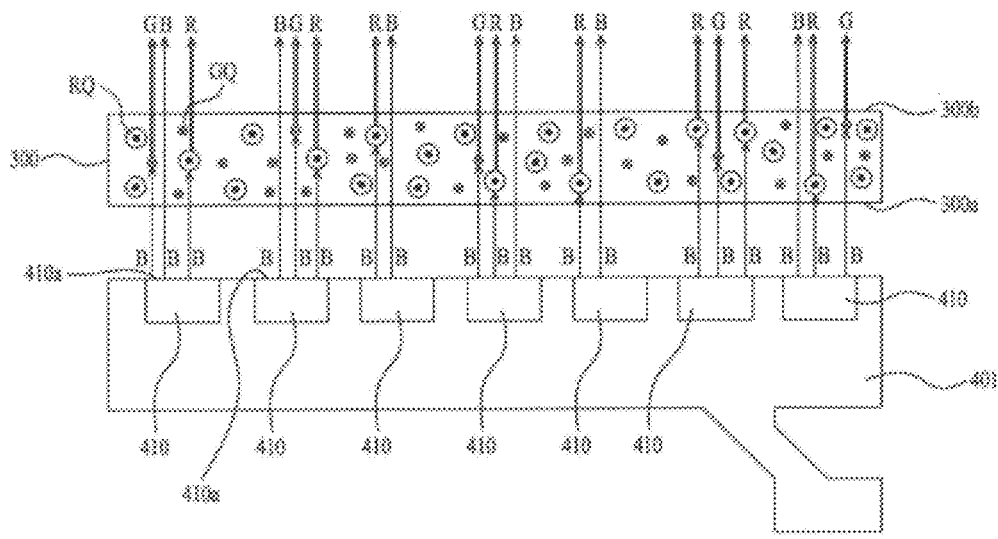
FIG. 6 is a schematic layout of a light emitting module according to the present invention.

FIG. 6 is a schematic layout of a light emitting module according to the present invention.

Referring to FIG. 6, a light emitting module according to the present invention may include a plurality of light source units spaced apart from each other by being supported by a light source unit supporter 401 and a fluorescent unit 300 unit attached to a light emitting surface of the light source unit via a light transmissive resin to transform a light incident from the light source unit into R, G, and B lights.

The light source unit may include a blue LED 410 that emits the B light having a relatively high light energy. And, the fluorescent unit 300 may include a light transmissive hollow pipe member provided in front of the light emitting surface of the light source unit and quantum dots with which the light transmissive hollow pipe member is filled. In particular, the quantum dots, with which the fluorescent unit 300 are charged, may include a red quantum dot RQ having a prescribed $1^{st}$ size to transform a light (i.e., the B light) incident from the blue LED 410 into the R light and a green quantum dot GQ having a $1^{st}$ size smaller than the $1^{st}$ size to transform the light (i.e., the B light) incident from the blue LED 410 into the G light.

A light emitting process of a light emitting module according to the present invention may be described as follows. First of all, one portion of the light provided by the light source unit passes through the fluorescent unit 300 and then enters a lateral side of the light guide plate 231. Another portion of the light provided by the light source unit is transformed into the R light by the red quantum dot RQ contained in the fluorescent unit 300 by changing its wavelength and then enters the lateral side of the light guide plate 231. The rest of the light provided by the light source unit is transformed into the G light by the green quantum dot GQ contained in the fluorescent unit 300 and then enters the lateral side of the light guide plate 231. In particular, the following description is made with reference to the light output surface 300b of the fluorescent unit 300. First of all, the light output surface 300b of the fluorescent unit 300 outputs the B light directly provided by the blue LED 410, the R light having its wavelength transformed by the red quantum dot RQ and the G light having its wavelength transformed by the green quantum dot GQ toward the light incident surface of the light guide plate 231. Hence, a white light may be generated from the light guide plate 231 in a manner that the R, G and B lights are synthesized together therein and may be then discharged via the light emission surface of the light guide plate 231.

According to the light emitting module of the present invention, the wavelength of the light from the light source unit may be transformed by the quantum dots into the strong lights (i.e., R light and G light) on a narrowband and the B light having high energy. And, the R, G and B lights may be provided to the light guide plate 231. Therefore, each color may be clearly represented on a display. And, luminance of the display may be raised higher than that of AMOLED.

Figure 7A:
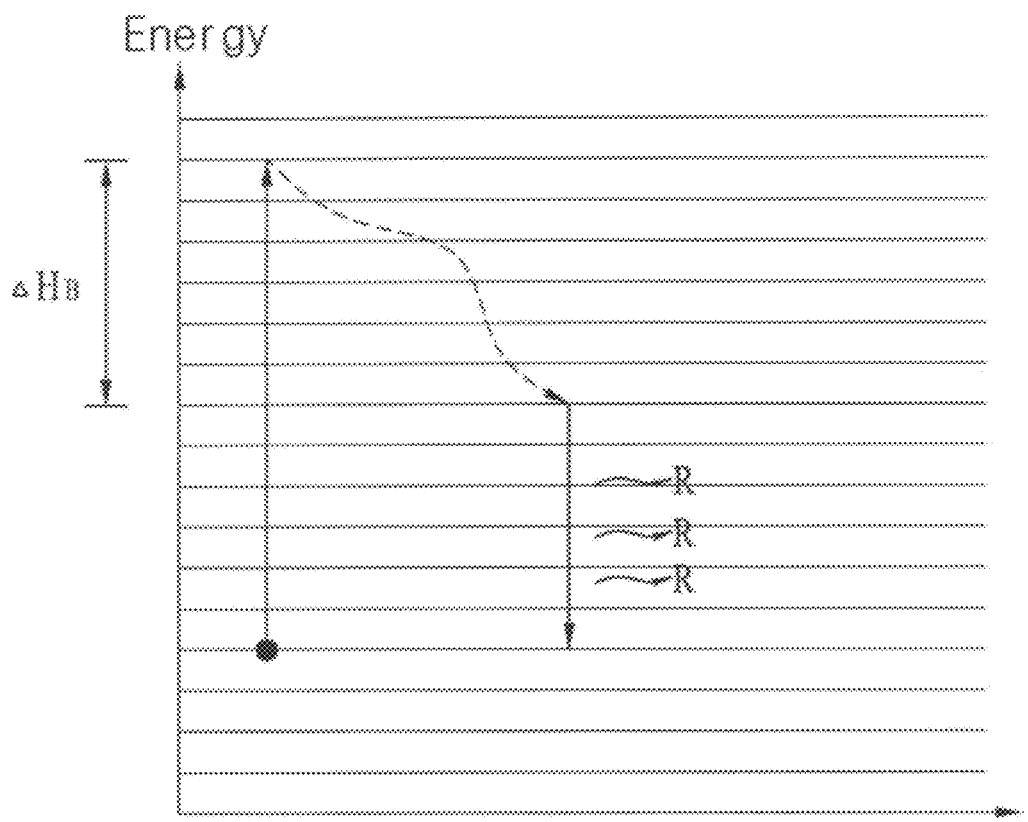
FIG. 7A and FIG. 7B are schematic graphs of exothermic heat quantity in case of light emission of red quantum dots in accordance with types of a light source unit.
Figure 7B:
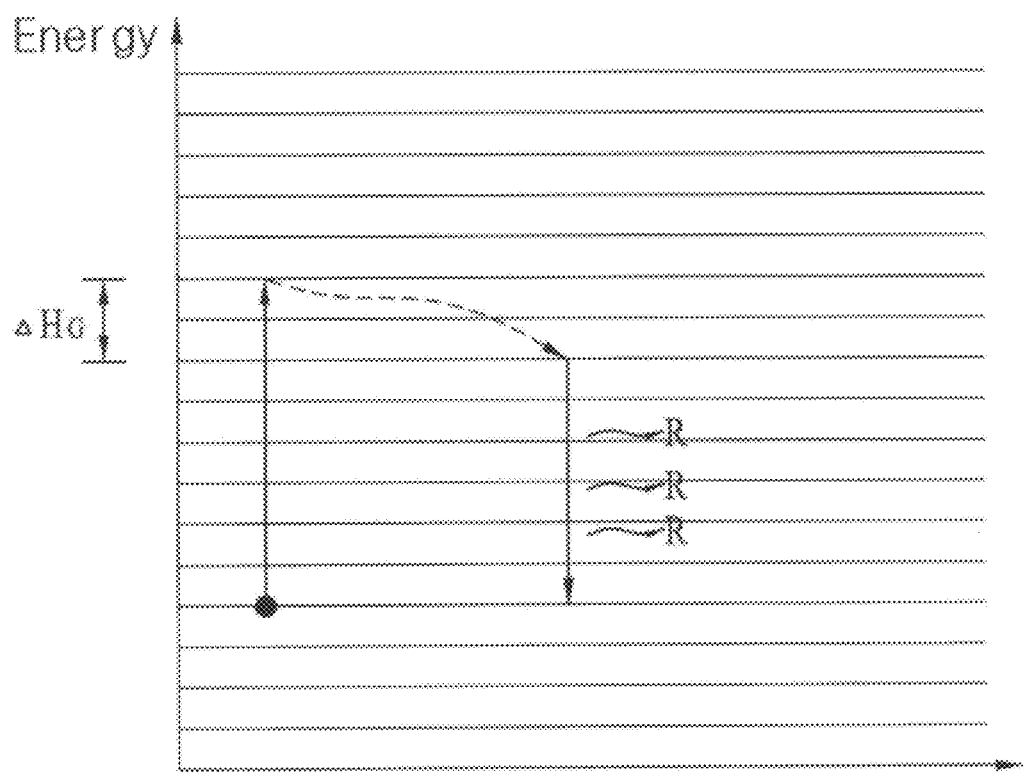

FIG. 7A and FIG. 7B are schematic graphs of exothermic heat quantity in case of light emission of red quantum dots in accordance with types of a light source unit. In particular, if the light source unit includes the blue LED 410, when the B light from the blue LED 410 is transformed (wave-transformed) into the R light by the red quantum dot RQ excited by the B light, FIG. 7A is a graph of exothermic heat quantity of the red quantum dot RQ. If the light source unit includes the green LED 420, when the G light from the green LED 420 is transformed (wave-transformed) into the R light by the red quantum dot RQ excited by the G light, FIG. 7B is a graph of exothermic heat quantity of the red quantum dot RQ.

Referring to FIG. 7A, after the red quantum dot RQ within the fluorescent unit 300 has been excited at a high energy level by the B light (having relatively high energy) discharged from the blue LED 410, it may emit the R light by discharging prescribed heat ($\Delta H_B$).

Referring to FIG. 7B, after the red quantum dot RQ within the fluorescent unit 300 has been excited at a high energy level by the G light (having relatively low energy) discharged from the blue LED 410, it may emit the R light by discharging prescribed heat ($\Delta H_G$).

Referring to FIG. 7A and FIG. 7B, in case that the light source unit includes the blue LED 410 or the green LED 420, it may enable to the red quantum dot RG to emit the R light. Yet, since the heat $\Delta H_B$ discharged from the R light emission of the blue LED 410 is considerably greater than the heat $\Delta H_G$ discharged from the R light emission of the green LED 420, it may shorten the expected life span of the quantum dots within the hollow pipe member vulnerable to heat. When the R light is emitted from the red quantum dot RQ, if at least one portion of the plurality of light source units include the blue LEDs 410 and the rest of the plurality of light source units include the green LEDs 420 instead of configuring all the light source units with the blue LEDs 410, it may be a means for enhancing the expected life span of the quantum dots.

For reference, the quantum dot may generally consist of a core part formed of CdSe, CdS, CdTe, ZnTe, OnP, InGaP or the like, a shell confining exiton formed by external energy or light within the core part and preventing the core parts from colliding with one another, and a ligand attached to a surface of the shell to enhance solubility of the quantum dot. Referring to the light emitting module shown in FIG. 6, according to the fluorescent unit of the present invention, as the red quantum dot RQ having a relatively large size enough to form the shell enclosing the core part, it may be able to efficiently protect the core part. On the contrary, since the green quantum dot GQ has a small size, it may not be enough for the shell to protect the core part. Hence, it may cause a problem that the green quantum dot GQ may have the expected life span shorter than that of the red quantum dot RQ. And, the problem has been experimentally proven. The green quantum dot GQ has a fabricating method more complicated than that of the red quantum dot RQ. And, the green quantum dot GQ has a production cost higher than that of the red quantum dot RQ. Besides, based on the description with reference to FIG. 7A and FIG. 7B, if all the light source units are constructed with the blue LEDs 410, it may cause a problem that the expected life span of the quantum dot is shortened.

In order to solve the above problems, the light emitting module according to the present invention may include a fluorescent unit 300 that does not contain a green quantum dot GQ. In particular, a display unit 200 including a light emitting module according to the present invention may include a display panel 210 (e.g., an LCD panel), a plurality of light source units 400 spaced apart from each other by being supported by a light source unit supporter 401 provided under the display panel 210, a light guide plate 231 provided under the display panel 210 to enable a light provided by the light source unit 400 to be incident on a lateral side, and a fluorescent unit 300 provided between the light source unit 400 and the lateral side of the light guide plate 231 entirely or partially. In this case, the fluorescent unit 300 may be configured to include quantum dots for transforming the light incident from the light source unit 400 into an R light partially or entirely. In particular, the fluorescent unit 300 may be configured to only include red quantum dots RQ partially or entirely.

In the following description, $1^{st}$ to $6^{th}$ embodiments of the present invention for a light emitting module may be explained with reference to FIGS. 8 to 13.

Figure 8:
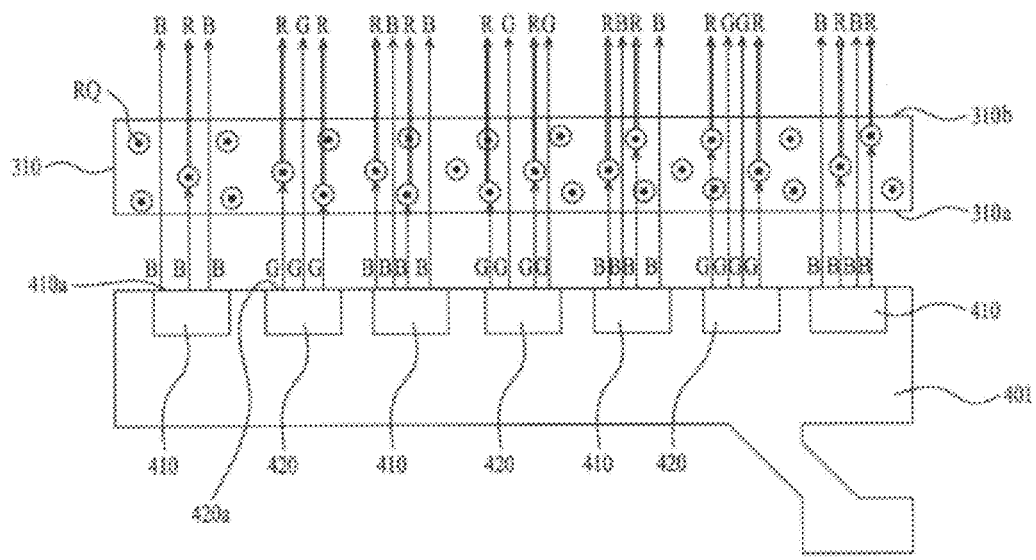
FIG. 8 is a schematic layout of a light emitting module according to a $1^{st}$ embodiment of the present invention.

FIG. 8 is a schematic layout of a light emitting module according to a $1^{st}$ embodiment of the present invention.

Referring to FIG. 8, a light emitting module according to a $1^{st}$ embodiment of the present invention may include a plurality of light source units 400 spaced apart from each other by being supported by a light source unit supporter 401 and a fluorescent unit 310 arranged between a lateral side of a light guide plate 231 and a plurality of the light guide units 400 overall.

The fluorescent unit 310 of the $1^{st}$ embodiment may include a light transmissive pipe member arranged in front of light emission surfaces 400a of the plurality of light source units 400 and quantum dots with which the light emissive pipe member is filled. In this case, the quantum dots, with which the pipe member is filled, may include red quantum dots RQ transforming the light incident from the light source unit 400 into the R light partially or entirely.

The plurality of light source units 400 of the $1^{st}$ embodiment may include a plurality of blue LEDs 410 directly emitting B lights and a plurality of green LEDs 420 directly emitting G lights. Preferably, the plurality of green LEDs 410 may be arranged among the plurality of blue LEDs 410. In particular, the B lights and the G lights may be simultaneously emitted from the plurality of light source units 400.

The green LED 420 may include the LED that emits a light having a wavelength rage of 505~574 nm (i.e., G light) and the blue LED 410 may include the LED that emits a light having a wavelength rage of 450~460 nm (i.e., B light).

A light emitting process of the light emitting module according to the $1^{st}$ embodiment of the present invention may be described as follows. First of all, referring to FIG. 8, the plurality of blue LEDs 410 and the plurality of green LEDs 420 are alternately arranged. Each of the blue LEDs 410 may emit a B light via its light emission surface 410a. And, each of the green LEDs 420 may emit a G light via its light emission surface 420a. As mentioned in the foregoing description, each of the B light and the G light may be wavelength-transformed into the R light by passing through the red quantum dot RQ. One portion of each of the B and G lights respectively discharged from the light emission surfaces 410a and 420a of the light source units 400 may enter the fluorescent unit 310 via the light input surface 310a of the fluorescent unit 310, may be transformed into the R light by the red quantum dot RQ contained in the fluorescent unit 310, and may be then outputted via the light output surface 310b of the fluorescent unit 310. The other portion of the B light discharged from the light emission surface 410a of the blue LED 410 may directly pass through the fluorescent unit 310 without colliding with the red quantum dot RQ and may be then discharged via the light output surface 310b of the fluorescent unit 310. The other portion of the G light discharged from the light emission surface 420a of the green LED 420 may directly pass through the fluorescent unit 310 without colliding with the red quantum dot RQ and may be then discharged via the light output surface 310b of the fluorescent unit 310. As a result, the R light wavelength-transformed by the red quantum dot RQ and the B and G lights directly passing through the fluorescent unit may be simultaneously discharged via the light output surface 310b of the fluorescent unit 310. Subsequently, the R, G and B lights discharged from the light output surface of the fluorescent unit may be incident on the light incident surface of the light guide plate 231 and may be then synthesized into a white light in the light guide plate 231. Finally, the synthesized white light may be discharged via the light emission surface of the light guide plate 231.

By the light emitting module according to the $1^{st}$ embodiment of the present invention, each color may be clearly represented on a display using quantum dots, luminance of the display may be considerably raised higher than that of AMOLED display, the expected life span of the fluorescent unit filled with the quantum dots may be enhanced in a manner of avoiding using a green quantum dot GQ having the expected life span shorter than that of a red quantum dot RQ, and the overall expected life span of a display unit may be elongated. When the light wavelength is transformed by the quantum dot, as the light emitting module according to the $1^{st}$ embodiment of the present invention may use the green LED 420 having a small exothermic heat quantity and the blue LED 410 having a big exothermic heat quantity by combining them together, the exothermic heat quantity within the fluorescent unit filled with the quantum dots may be reduced. Therefore, the expected life span of the fluorescent unit may be elongated, whereby the overall expected life span of the display unit may be further enhanced.

Figure 9:
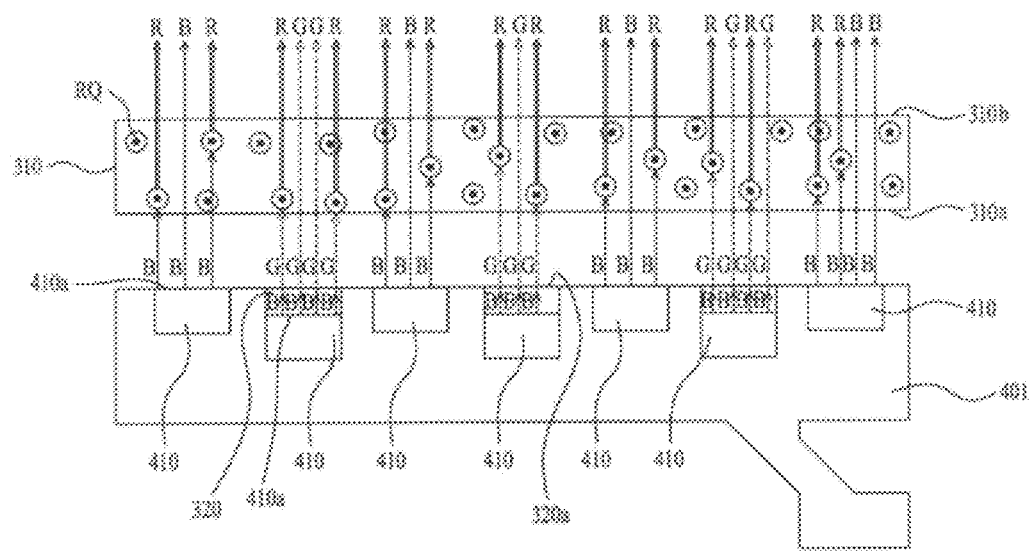
FIG. 9 is a schematic layout of a light emitting module according to a $2^{nd}$ embodiment of the present invention.

FIG. 9 is a schematic layout of a light emitting module according to a $2^{nd}$ embodiment of the present invention.

Referring to FIG. 9, a light emitting module according to a $2^{nd}$ embodiment of the present invention may include a plurality of light source units 400 spaced apart from each other by being supported by a light source unit supporter 401 and a fluorescent unit 310 arranged between a lateral side of a light guide plate 231 and a plurality of the light guide units 400 overall.

The fluorescent unit 310 of the $1^{st}$ embodiment may include a light transmissive pipe member arranged in front of light emission surfaces 400a of the plurality of light source units 400 and quantum dots with which the light emissive pipe member is filled. In this case, the quantum dots, with which the pipe member is filled, may include red quantum dots RQ transforming the light incident from the light source unit 400 into the R light partially or entirely.

Moreover, the light emitting module according to the $2^{nd}$ embodiment of the present invention may further include an intermediate fluorescent unit 320 containing a green fluorescent material as well as the fluorescent unit 310 filled with the quantum dots. The intermediate fluorescent unit 320 may be arranged on a light emission surface 410a of the light emitting unit 410. In particular, the intermediate fluorescent unit 320 may be provided between the light source unit and the florescent unit to be supported by the light source supporter 401. Like the fluorescent unit 310, the intermediate fluorescent unit 320 may include a light emissive pipe member arranged in front of the light emission surface 410a of the light source unit and a green fluorescent material with which the light emissive pipe member may be filled. In this case, the intermediate fluorescent unit 320 may be attached to the light emission surface 410a of the light source unit via a light transmissive resin. Alternatively, the intermediate fluorescent unit 320 may be coated on the light emission surface 410a of the light source unit. The green fluorescent material may include the material that absorbs the light from the light source unit to emit G light, which is a visible beam, amounting to a difference between an excitation state and a ground state. Preferably, the green fluorescent material may include one of $BaMgAl_{10}O_{17}:Eu$, $(YGd)BO_3:Tb$ and $Zn_2SiO_4:Mn$, by which the present invention may be non-limited. Alternatively, any fluorescent material capable of emitting G light transformed from the light of the light source unit may be used as the green fluorescent material.

The plurality of light source units 400 of the $2^{nd}$ embodiment may include a plurality of blue LEDs 410 directly emitting B lights. And, the intermediate fluorescent unit 320 including the green fluorescent material may be provided to the light emission surfaces 410a of some of the plurality of blue LEDs 410. Preferably, some of the blue LEDs 410 respectively having the intermediate fluorescent units 320 provided to their light emission surfaces 410a among the plurality of blue LEDs 410 may be provided between the rest of the blue LEDs 410 not having the intermediate fluorescent unit 320 provided to their light emission surfaces 410a among the plurality of blue LEDs 410. Hence, a plurality of the light sources 410 and the intermediate fluorescent units 320 may discharge the B light and the G light simultaneously.

The blue LED 410 may include the LED that emits a light having a wavelength rage of 450~460 nm (i.e., B light). And, a UV LED may be usable as the light source unit having the intermediate fluorescent unit 320 provided to its light emission surface 410a instead of the blue LED 410.

A light emitting process of the light emitting module according to the $2^{nd}$ embodiment of the present invention may be described as follows. First of all, referring to FIG. 9, each of the plurality of blue LEDs 410 may emit a B light via its light emission surface 410a. In this case, the B light discharged from the light emission surface 410a of the blue LED 410 having the intermediate fluorescent unit 320 may be incident on the light input surface of the intermediate fluorescent unit 320 and may then emit the G light from the light output surface 320a of the intermediate fluorescent unit 320. On the other hand, the B light discharged from the light emission surface 410a of the blue LED 410 not having the intermediate fluorescent unit 320 may be directly incident on the light input surface 310a of the fluorescent unit 310. As mentioned in the foregoing description, each of the B light and the G light may be incident on the light input surface 310a of the fluorescent unit and may be then wavelength-transformed into the R light by passing through the red quantum dot RQ. One portion of the B light discharged from the light emission surface of the light source unit and one portion of the G light discharged from the light output surface of the intermediate fluorescent unit 320 may enter the fluorescent unit via the light input surface 310a of the fluorescent unit, may be transformed into the R light by the red quantum dot RQ contained in the fluorescent unit, and may be then outputted via the light output surface 310b of the fluorescent unit. The other portion of the B light discharged from the light emission surface of the blue LED 410 may directly pass through the fluorescent unit without colliding with the red quantum dot RQ and may be then discharged via the light output surface 310b of the fluorescent unit. The other portion of the G light discharged from the light emission surface of the intermediate fluorescent unit 320 may directly pass through the fluorescent unit without colliding with the red quantum dot RQ and may be then discharged via the light output surface 310b of the fluorescent unit. As a result, the R light wavelength-transformed by the red quantum dot RQ and the B and G lights directly passing through the fluorescent unit may be simultaneously discharged via the light output surface 310b of the fluorescent unit. Subsequently, the R, G and B lights discharged from the light output surface of the fluorescent unit may be incident on the light incident surface of the light guide plate 231 and may be then synthesized in the light guide plate 231. Finally, the synthesized white light may be then discharged via the light emission surface of the light guide plate 231.

By the light emitting module according to the $2^{nd}$ embodiment of the present invention, each color may be clearly represented on a display using quantum dots, luminance of the display may be considerably raised higher than that of AMOLED display, the expected life span of the fluorescent unit filled with the quantum dots may be enhanced in a manner of avoiding using a green quantum dot GQ having the expected life span shorter than that of a red quantum dot RQ, and the overall expected life span of a display unit may be elongated. When the light wavelength is transformed by the quantum dots, as the light emitting module according to the $2^{nd}$ embodiment of the present invention may use the green LED 420 having a small exothermic heat quantity and the blue LED 410 having a big exothermic heat quantity by combining them together, the exothermic heat quantity within the fluorescent unit filled with the quantum dots may be reduced. Therefore, the expected life span of the fluorescent unit may be elongated, whereby the overall expected life span of the display unit may be further enhanced.

Figure 10:
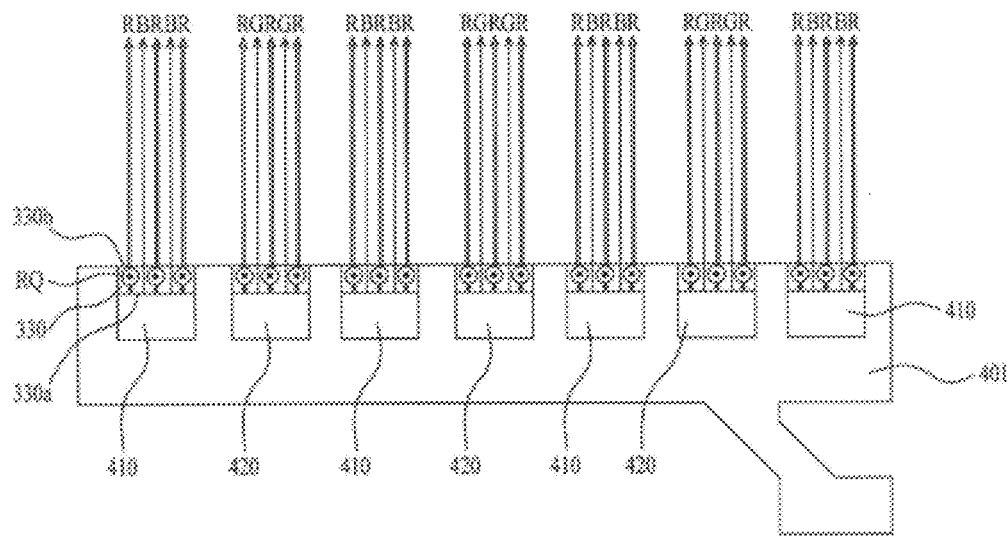
FIG. 10 is a schematic layout of a light emitting module according to a $3^{rd}$ embodiment of the present invention.

FIG. 10 is a schematic layout of a light emitting module according to a $3^{rd}$ embodiment of the present invention.

Referring to FIG. 10, a light emitting module according to a $3^{rd}$ embodiment of the present invention may include a plurality of light source units 400 spaced apart from each other by being supported by a light source unit supporter 401 and a fluorescent unit 330 arranged between a lateral side of a light guide plate 231 and a plurality of the light guide units 400 in part.

The fluorescent unit 330 of the $3^{rd}$ embodiment may include a plurality of light transmissive pipe members respectively arranged onto light emission surfaces of the plurality of light source units 400 and quantum dots with which each of the light emissive pipe members is filled. In particular, each of a plurality of the light transmissive pipe members may include a small-scale pipe member having a size corresponding to that of a light emission surface of the light source unit. And, the quantum dots, with which the pipe member is filled, may include red quantum dots RQ transforming the light incident from the light source unit 400 into the R light partially or entirely. Moreover, the fluorescent unit 330 may be provided onto the light emission surface of the light source unit to be supported by the light source unit supporter 401 together with the light source unit.

The plurality of light source units 400 of the $3^{rd}$ embodiment may include a plurality of blue LEDs 410 directly emitting B lights and a plurality of green LEDs 420 directly emitting G lights. Preferably, the plurality of green LEDs 410 may be arranged among the plurality of blue LEDs 410. In particular, the B lights and the G lights may be simultaneously emitted from the plurality of light source units 400.

The green LED 420 may include the LED that emits a light having a wavelength rage of 505~574 nm (i.e., G light) and the blue LED 410 may include the LED that emits a light having a wavelength rage of 450~460 nm (i.e., B light).

A light emitting process of the light emitting module according to the $3^{rd}$ embodiment of the present invention may be described as follows. First of all, referring to FIG. 10, the plurality of blue LEDs 410 and the plurality of green LEDs 420 may be alternately arranged. Each of the blue LEDs 410 may emit a B light via its light emission surface 410a. And, each of the green LEDs 420 may emit a G light via its light emission surface 420a. As mentioned in the foregoing description, each of the B light and the G light may be wavelength-transformed into the R light by passing through the red quantum dot RQ. One portion of each of the B and G lights respectively discharged from the light emission surfaces 410a and 420a of the light source units 400 may enter the fluorescent unit 330 via the light input surface 330a of the fluorescent unit 330, may be transformed into the R light by the red quantum dot RQ contained in the fluorescent unit 330, and may be then outputted via the light output surface 330b of the fluorescent unit 330. The other portion of the B light discharged from the light emission surface 410a of the blue LED 410 may directly pass through the fluorescent unit without colliding with the red quantum dot RQ and may be then discharged via the light output surface 330b of the fluorescent unit 330. The other portion of the G light discharged from the light emission surface 420a of the green LED 420 may directly pass through the fluorescent unit 330 without colliding with the red quantum dot RQ and may be then discharged via the light output surface 330b of the fluorescent unit 330. As a result, the R light wavelength-transformed by the red quantum dot RQ and the B and G lights directly passing through the fluorescent unit may be simultaneously discharged via the light output surface 330b of the fluorescent unit 330. Subsequently, the R, G and B lights discharged from the light output surface 330b of the fluorescent unit 330 may be incident on the light incident surface 231a of the light guide plate 231 and may be then synthesized into a white light in the light guide plate 231. Finally, the synthesized white light may be discharged via the light emission surface of the light guide plate 231.

By the light emitting module according to the $3^{rd}$ embodiment of the present invention, each color may be clearly represented on a display using quantum dots, luminance of the display may be considerably raised higher than that of AMOLED display, the expected life span of the fluorescent unit filled with the quantum dots may be enhanced in a manner of avoiding using a green quantum dot GQ having the expected life span shorter than that of a red quantum dot RQ, and the overall expected life span of a display unit may be elongated. When the light wavelength is transformed by the quantum dot, as the light emitting module according to the $3^{rd}$ embodiment of the present invention may use the green LED 420 having a small exothermic heat quantity and the blue LED 410 having a big exothermic heat quantity by combining them together, the exothermic heat quantity within the fluorescent unit filled with the quantum dots may be reduced. As the fluorescent unit is constructed with a plurality of the small-scale pipe members, a heat radiating surface size over volume may be increased. Therefore, the expected life span of the fluorescent unit may be elongated, whereby the overall expected life span of the display unit may be further enhanced.

Figure 11:
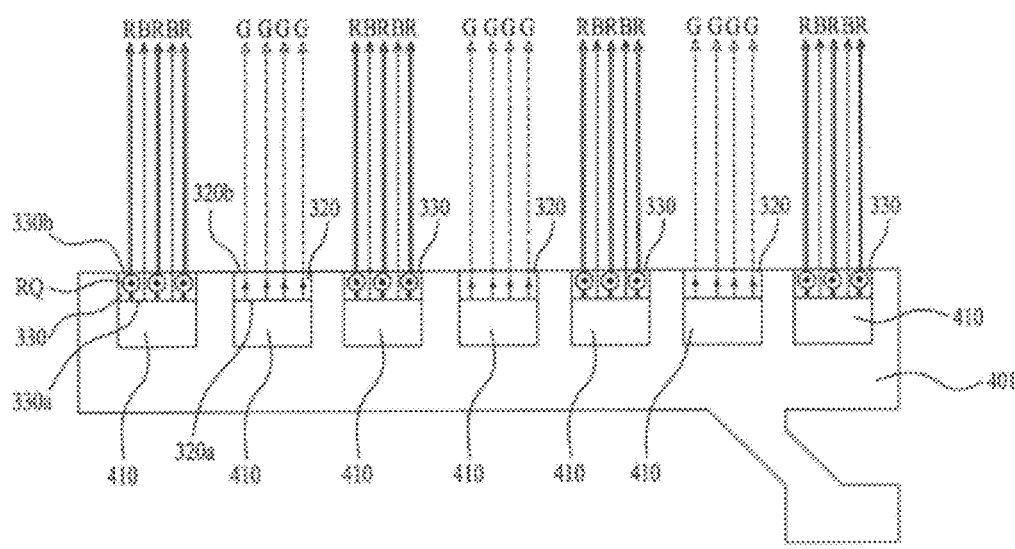
FIG. 11 is a schematic layout of a light emitting module according to a $4^{th}$ embodiment of the present invention.

FIG. 11 is a schematic layout of a light emitting module according to a $4^{th}$ embodiment of the present invention.

Referring to FIG. 11, a light emitting module according to a $4^{th}$ embodiment of the present invention may include a plurality of light source units 400 spaced apart from each other by being supported by a light source unit supporter 401 and a fluorescent unit 320/330 arranged between a lateral side of a light guide plate 231 and a plurality of the light guide units 400 in part.

The fluorescent unit of the $4^{th}$ embodiment may include a plurality of $1^{st}$ fluorescent units 330, each of which includes a light transmissive pipe member, and quantum dots, with which the light emissive pipe member is filled, and a plurality of $2^{nd}$ fluorescent units 320 containing green fluorescent material therein.

The $1^{st}$ fluorescent units 330 may be arranged on light emission surfaces of some of the plurality of light source units, respectively. And, the $1^{st}$ fluorescent unit 330 may be supported by the light source unit supporter 401 together with the light source unit. In particular, each of a plurality of the light transmissive pipe members included in the $1^{st}$ fluorescent units may include a small-scale pipe member having a size corresponding to that of a light emission surface of the light source unit. And, the quantum dots, with which the pipe member is filled, may include red quantum dots RQ transforming the light incident from the light source unit into the R light partially or entirely. Moreover, $1^{st}$ the fluorescent unit 330 may be provided onto the light emission surface 410a of the light source unit 410 and may be supported by the light source unit supporter 401 together with the light source unit 410.

The $2^{nd}$ fluorescent units 320 may be arranged on light emission surfaces of the rest of the light source units, respectively. And, the $2^{nd}$ fluorescent unit 320 may be supported by the light source unit supporter 401 together with the light source unit. Like the $1^{st}$ fluorescent unit 310, the $2^{nd}$ fluorescent unit 320 may include a light emissive pipe member arranged onto the light emission surface of the light source unit and a green fluorescent material with which the light emissive pipe member may be filled. In this case, the $2^{nd}$ fluorescent unit 320 may be attached to the light emission surface of the light source unit via a light transmissive resin. Alternatively, the $2^{nd}$ fluorescent unit 320 may be coated on the light emission surface of the light source unit. The green fluorescent material may include the material that absorbs the light from the light source unit to emit G light, which is a visible beam, amounting to a difference between an excitation state and a ground state. Preferably, the green fluorescent material may include one of $BaMgAl_{10}O_{17}$:Eu, (YGd)$BO_3$:Tb and $Zn_2SiO_4$:Mn, by which the present invention may be non-limited. Alternatively, any fluorescent material capable of emitting G light transformed from the light of the light source unit may be used as the green fluorescent material.

Preferably, the plurality of 2nd fluorescent units 320 may be arranged among a plurality of the 1rst fluorescent units 330. In particular, the $2^{nd}$ fluorescent unit 320 and the $1^{st}$ fluorescent unit 320 may alternate with each other.

The plurality of light source units of the $4^{th}$ embodiment may include a plurality of blue LEDs 410 directly emitting B lights. And, the $1^{st}$ fluorescent units 330 may be provided to the light emission surfaces of some of the plurality of blue LEDs 410, respectively. And, the $2^{nd}$ fluorescent units 320 may be provided to the light emission surfaces of the rest of the blue LEDs 410, respectively. Preferably, the blue LED 410 may include the LED that emits a light having a wavelength rage of 450~460 nm (i.e., B light). Preferably, a UV LED may be usable as the light source unit having the $2^{nd}$ fluorescent unit 320 instead of the blue LED 410.

A light emitting process of the light emitting module according to the $4^{th}$ embodiment of the present invention may be described as follows. First of all, referring to FIG. 11, each of the blue LEDs 410 (i.e., light source units) may emit B light via its light emission surface 410a. Since the $1^{st}$ fluorescent units 300 are provided to prescribed LEDs among the plurality of blue LEDs 410, respectively, one portion of the B light emitted from each of the prescribed LEDs may enter the $1^{st}$ fluorescent unit 330 via the light input surface 330a of the $1^{st}$ fluorescent unit 330, may be wave-transformed into R light by the red quantum dot RQ contained in the $1^{st}$ fluorescent unit 330, and may be then discharged as the R light via the light output surface 330b of the $1^{st}$ fluorescent unit 330. The other portion of the B light discharged from each of the prescribed LEDs may enter the $1^{st}$ fluorescent unit 330 via the light input surface 330a of the $1^{st}$ fluorescent unit 330, may directly pass through the $1^{st}$ fluorescent unit 330, and may be then discharged as the B light. Since the $2^{nd}$ fluorescent units 320 are provided to the rest of the blue LEDs 410, the B light discharged from each of the rest of the blue LEDs may be discharged as G light by the green fluorescent material contained in the corresponding $2^{nd}$ fluorescent unit 320. As a result, the R light wavelength-transformed by the red quantum dot RQ, the B light directly passing through the fluorescent unit and the G light discharged by the green fluorescent material may be simultaneously discharged via the light output surfaces 330b and 320b of the fluorescent units. Subsequently, the R, G and B lights discharged from the light output surfaces of the fluorescent units may be incident on the light incident surface 231a of the light guide plate 231 and may be then synthesized into a white light in the light guide plate 231. Finally, the synthesized white light may be discharged via the light emission surface of the light guide plate 231.

By the light emitting module according to the $4^{th}$ embodiment of the present invention, each color may be clearly represented on a display using quantum dots, luminance of the display may be considerably raised higher than that of AMOLED display, the expected life span of the fluorescent unit filled with the quantum dots may be enhanced in a manner of avoiding using a green quantum dot GQ having the expected life span shorter than that of a red quantum dot RQ, and the overall expected life span of a display unit may be elongated. As the $1^{st}$ fluorescent unit 330 filled with quantum dots is constructed with a plurality of the small-scale pipe members, a heat radiating surface size over volume may be increased. Therefore, the expected life span of the $1^{st}$ fluorescent unit 330 may be elongated, whereby the overall expected life span of the display unit may be further enhanced.

Figure 12:
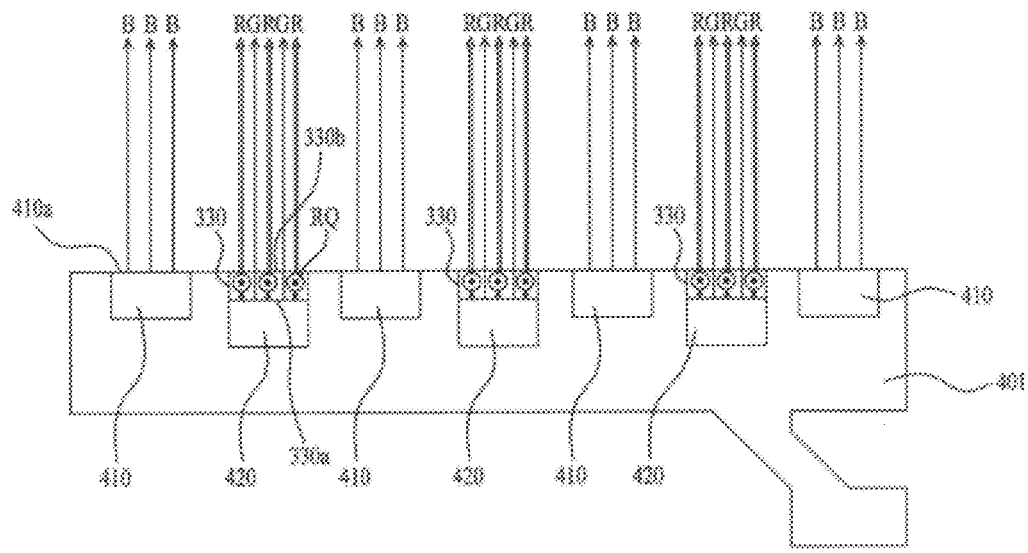
FIG. 12 is a schematic layout of a light emitting module according to a $5^{th}$ embodiment of the present invention.

FIG. 12 is a schematic layout of a light emitting module according to a $5^{th}$ embodiment of the present invention.

Referring to FIG. 12, a light emitting module according to a $5^{th}$ embodiment of the present invention may include a plurality of light source units 400 spaced apart from each other by being supported by a light source unit supporter 401 and a fluorescent unit 330 arranged between a lateral side of a light guide plate 231 and a plurality of the light guide units 400 in part.

The fluorescent unit 330 of the $5^{th}$ embodiment may include a plurality of light transmissive pipe members respectively arranged onto light emission surfaces of one portion of the plurality of light source units and quantum dots with which each of the light emissive pipe members is filled. In this case, the one portion of the light source units 400 may include green LED 420 which will be explained in the following description. The quantum dots contained in the pipe member may include the red quantum dots RQ for transforming the G light incident from the light source unit into the R light entirely or in part. In particular, each of a plurality of the light transmissive pipe members included in the fluorescent unit 330 may include a small-scale pipe member having a size corresponding to that of a light emission surface 420a of the light source unit. And, the fluorescent unit 330 may be arranged onto the light emission surface of the light source unit to be supported by the light source supporter 401 together with the light source unit.

The plurality of light source units 400 of the $5^{th}$ embodiment may include a plurality of blue LEDs 410 directly emitting B lights and a plurality of green LEDs 420 directly emitting G lights. Preferably, the plurality of green LEDs 410 may be alternately arranged among the plurality of blue LEDs 410. In particular, the B lights and the G lights may be simultaneously emitted from the plurality of light source units 400. The fluorescent unit 330 filled with the red quantum dots RQ may be arranged onto the light emission surface 420a of the green LED 420. And, the green LED 430 and the fluorescent unit may be supported by the light source supporter 401 together. On the contrary, any fluorescent unit may not be arranged on the light emission surface 410a of the blue LED 410.

The green LED 420 may include the LED that emits a light having a wavelength rage of 505~574 nm (i.e., G light) and the blue LED 410 may include the LED that emits a light having a wavelength rage of 450~460 nm (i.e., B light).

A light emitting process of the light emitting module according to the $5^{th}$ embodiment of the present invention may be described as follows. First of all, referring to FIG. 12, the plurality of blue LEDs 410 and the plurality of green LEDs 420 may be alternately arranged. Each of the blue LEDs 410 may emit a B light via its light emission surface 410a. And, each of the green LEDs 420 may emit a G light via its light emission surface 420a. Since any fluorescent unit is not arranged on the light emission surface 410a of the blue LED 410, the B light emitted from the light emission surface 410a of the blue LED 410 may be directly incident of the light incident surface of the light guide plate 231. One portion of the G light discharged from the light emission surfaces 420a of the green LED 420 having the fluorescent unit 330 may enter the fluorescent unit 330 via the light input surface 330a of the fluorescent unit 330, may be transformed into the R light by the red quantum dot RQ contained in the fluorescent unit 330, and may be then outputted via the light output surface 330b of the fluorescent unit 330. The other portion of the G light discharged from the light emission surface 420a of the green LED 420 may directly pass through the fluorescent unit without colliding with the red quantum dot RQ and may be then discharged via the light output surface 330b of the fluorescent unit 330. As a result, the R light wavelength-transformed by the red quantum dot RQ and the G light directly passing through the fluorescent unit may be incident on the light incident surface of the light guide plate 231. Simultaneously, the B light discharged from the blue LED 410 may be incident on the light incident surface of the light guide plate 231 as well. The R, G and B lights incident on the light incident surface of the light guide plate 231 may be then synthesized into a white light in the light guide plate 231. Finally, the synthesized white light may be discharged via the light emission surface of the light guide plate 231.

By the light emitting module according to the $5^{th}$ embodiment of the present invention, each color may be clearly represented on a display using quantum dots, luminance of the display may be considerably raised higher than that of AMOLED display, the expected life span of the fluorescent unit filled with the quantum dots may be enhanced in a manner of avoiding using a green quantum dot GQ having the expected life span shorter than that of a red quantum dot RQ, and the overall expected life span of a display unit may be elongated. When the light wavelength is transformed by the quantum dot, as the G light of the green LED 420 having a small exothermic heat quantity may be configured to pass through the quantum dot, the exothermic heat quantity within the fluorescent unit filled with the quantum dots may be reduced. Therefore, the expected life span of the fluorescent unit may be elongated, whereby the overall expected life span of the display unit may be further enhanced. Besides, as the fluorescent unit filed with quantum dots is constructed with a plurality of the small-scale pipe members, a heat radiating surface size over volume may be increased. Therefore, the expected life span of the fluorescent unit may be elongated, whereby the overall expected life span of the display unit may be further enhanced.

Figure 13:
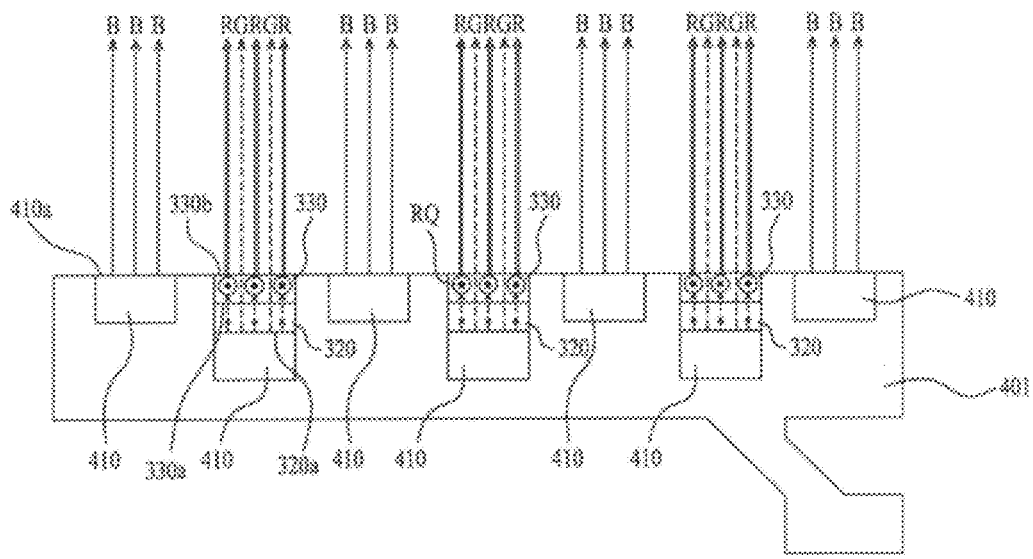
FIG. 13 is a schematic layout of a light emitting module according to a $3^{rd}$ embodiment of the present invention.

FIG. 13 is a schematic layout of a light emitting module according to a $3^{rd}$ embodiment of the present invention.

Referring to FIG. 13, a light emitting module according to a $6^{th}$ embodiment of the present invention may include a plurality of light source units 400 spaced apart from each other by being supported by a light source unit supporter 401 and a fluorescent unit 320/330 arranged between a lateral side of a light guide plate 231 and a plurality of the light guide units 400 in part.

In particular, the plurality of light source units 400 may include a plurality of blue LEDs 410, respectively. And, a $2^{nd}$ fluorescent unit 320 including a green fluorescent material may be provided to a light emission surface 410a of each of one portion of the plurality of blue LEDs 410. And a $1^{st}$ fluorescent unit 330 including a plurality of light transmissive pipe members and quantum dots contained in the pipe members may be provided onto a light emission surface of the $2^{nd}$ fluorescent unit 320.

In particular, the $2^{nd}$ fluorescent unit 320 and the $1^{st}$ fluorescent unit 330 may be provided to the light emission surface of each of one portion of the plurality of blue LEDs 410, while any fluorescent unit may not be provided to a light emission surface of each of the other portion of the blue LEDs 410.

Preferably, the LED having the $1^{st}$ and $2^{nd}$ fluorescent units 330 and 320 provided to its light emission surface may be arranged between the LEDs having no fluorescent unit provided to its light emission surface.

Each of a plurality of the light transmissive pipe members included in the fluorescent unit 330 may include a small-scale pipe member having a size corresponding to that of a light emission surface of the light source unit. And, quantum dots contained in the pipe member may include red quantum dots RQ for transforming the incident light from the light source unit into R light entirely or in part.

The $2^{nd}$ fluorescent unit 320 may be arranged between the light emission surface of the light source unit and a light input surface of the $1^{st}$ fluorescent unit 330. Like the $1^{st}$ fluorescent unit 330, the $2^{nd}$ fluorescent unit 320 may include a light transmissive pipe member arranged on a light output surface of the light source unit and a green fluorescent material contained in the light transmissive pipe member. In this case, the $2^{nd}$ fluorescent unit 320 may be attached to the light output surface of the light source unit via a light transmissive resin. Alternatively, the $2^{nd}$ fluorescent unit 320 may be coated on the light emission surface of the light source unit. The green fluorescent material may include the material that absorbs the light from the light source unit to emit G light, which is a visible beam, amounting to a difference between an excitation state and a ground state. Preferably, the green fluorescent material may include one of $BaMgAl_{10}O_{17}$:Eu, $(YGd)BO_3$:Tb and $Zn_2SiO_4$:Mn, by which the present invention may be non-limited. Alternatively, any fluorescent material capable of emitting G light transformed from the light of the light source unit may be used as the green fluorescent material.

A light emitting process of the light emitting module according to the $6^{th}$ embodiment of the present invention may be described as follows. First of all, referring to FIG. 13, if the blue LED 410 having no fluorescent unit provided to its light emission surface discharges B light, the discharged B light may be directly incident on the light incident surface of the light guide plate 231. On the contrary, the blue LED 410 having the $2^{nd}$ fluorescent unit 320 and the $1^{st}$ fluorescent unit 330 may discharge or emit a B light from its light emission surface. The discharged B light may be enter the $2^{nd}$ fluorescent unit 320 via the light input surface of the second fluorescent unit 320 and may be then discharged as G light by the green fluorescent material contained in the $2^{nd}$ fluorescent unit 320. One portion of the G light may be incident on the light input surface of the $1^{st}$ fluorescent unit 330, may be wave-transformed by the red quantum dots RQ contained in the $1^{st}$ fluorescent unit 330, and may be then discharged as the R light. One portion of the G light may be incident on the light input surface of the $1^{st}$ fluorescent unit 330 and may be then directly discharged as the G light via the light output surface without passing through the red quantum dot RQ. As a result, the B light directly incident from the blue LED 410, the R light wavelength-transformed by the red quantum dot RQ and the G light directly passing through the $1^{st}$ fluorescent unit 330 may be incident on the light incident surface of the light guide plate 231. The R, G and B lights incident on the light incident surface of the light guide plate 231 may be then synthesized into a white light in the light guide plate 231. Finally, the synthesized white light may be discharged via the light emission surface of the light guide plate 231.

By the light emitting module according to the 6$^{th}$ embodiment of the present invention, each color may be clearly represented on a display using quantum dots, luminance of the display may be considerably raised higher than that of AMOLED display, the expected life span of the fluorescent unit filled with the quantum dots may be enhanced in a manner of avoiding using a green quantum dot GQ having the expected life span shorter than that of a red quantum dot RQ, and the overall expected life span of a display unit may be elongated. When the light wavelength is transformed by the quantum dot, as the G light having a small exothermic heat quantity is wave-transformed into the R light, the exothermic heat quantity within the fluorescent unit filled with the quantum dots may be reduced. Therefore, the expected life span of the fluorescent unit may be elongated, whereby the overall expected life span of the display unit may be further enhanced. Besides, as the fluorescent unit filed with quantum dots is constructed with a plurality of the small-scale pipe members, a heat radiating surface size over volume may be increased. Therefore, the expected life span of the fluorescent unit may be elongated, whereby the overall expected life span of the display unit may be further enhanced.

The above-described mobile terminal 100 above may be applicable, not limited to the configuration and method described in the embodiments, but to some or entire combinations of the embodiments such that various modifications are made available.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a display panel configured for displaying information, the display panel having a first surface and a second surface opposite the first surface, the first surface facing an exterior of the mobile terminal and the second surface facing an interior of the mobile terminal;
   a plurality of light source units positioned in the interior of the mobile terminal under the display panel, the plurality of light source units comprising a plurality of blue light emitting diodes (LEDs) and a plurality of green LEDs, and each of the plurality of light source units are spaced apart from other of the plurality of light source units;
   a fluorescent unit positioned on a light emission surface of at least a portion of the plurality of light source units, the fluorescent unit comprising a plurality of red quantum dots; and
   a light guide plate positioned in the interior of the mobile terminal under the display panel,
   wherein a portion of blue light emitted from the blue LEDs and a portion of green light emitted from the green LEDs are transformed into red light by colliding with the plurality of red quantum dots and the red light is output via a light output surface of the fluorescent unit,
   wherein another portion of the blue light and another portion of the green light pass directly through the fluorescent unit without colliding with the plurality of red quantum dots, and the another portion of the blue light and the another portion of the green light are output via the light output surface of the fluorescent unit, and
   wherein the red light, the green light and the blue light output via the light output surface of the fluorescent unit are synthesized into a white light in the light guide plate.

2. The mobile terminal of claim 1, wherein:
   the fluorescent unit further comprises a light transmissive hollow pipe member positioned in front of the light emission surface of the at least a portion of the plurality of light source units; and
   each of the plurality of red quantum dots are contained in the hollow pipe member.

3. The mobile terminal of claim 1, wherein the plurality of green LEDs are alternately positioned between the plurality of blue LEDs.

4. The mobile terminal of claim 1,
   wherein a light provided from at least the light emission surface of each of the plurality of light source units or a light output surface of the fluorescent unit is incident on a lateral side of the light guide plate.

5. The mobile terminal of claim 1, wherein:
   the fluorescent unit further comprises a plurality of light transmissive hollow pipe members;
   each of the plurality of light transmissive hollow pipe members is positioned in front of the light emission surface of one of the at least a portion of the plurality of light source units; and
   each of the plurality of hollow pipe members contains at least one red quantum dot of the plurality of red quantum dots.

6. The mobile terminal of claim 5,
   wherein a light provided from at least the light emission surface of each of the plurality of light source units or a light output surface of the fluorescent unit is incident on a lateral side of the light guide plate.

7. The mobile terminal of claim 1, wherein the fluorescent unit further comprises a light transmissive hollow pipe member containing the plurality of red quantum dots, the light transmissive hollow pipe member positioned in front of a light emission surface of each of the plurality of green LEDs.

8. A mobile terminal, comprising:
   a display panel configured for displaying information, the display panel having a first surface and a second surface opposite the first surface, the first surface facing an exterior of the mobile terminal and the second surface facing an interior of the mobile terminal;
   a portion of a plurality of light source units positioned in the interior of the mobile terminal under the display panel, the plurality of light source units comprising a plurality of blue light emitting diodes (LEDs), and each of the plurality of light source units are spaced apart from other of the plurality of light source units;
   a fluorescent unit positioned on a light emission surface of at least a portion of the plurality of light source units, the fluorescent unit comprising a plurality of red quantum dots;
   a plurality of intermediate fluorescent units containing a green fluorescent material and positioned on the light emission surface of each blue LED of at the least a portion of the plurality of light source units, such that the green fluorescent material absorbs the blue light from each blue LED and emits green light; and
   a light guide plate positioned in the interior of the mobile terminal under the display panel,
   wherein a portion of blue light emitted from the blue LEDs and a portion of green light emitted from the intermediate fluorescent units are transformed into red light by colliding with the plurality of red quantum dots, and the red light is output via a light output surface of the fluorescent unit, wherein another portion of the blue light and another portion of the green light directly pass through the fluorescent unit without colliding with the red quantum dots, and the another portion of the blue light and the another portion of the green light are output via the light output surface of the fluorescent unit, and wherein the red light, the green light and the blue light output via the light output surface of the fluorescent unit are synthesized into a white light in the light guide plate.

9. The mobile terminal of claim 8, wherein each of the blue LEDs of the at least the portion of the light source units is positioned between blue LEDs of a remaining portion of the plurality of light source units, each of the blue LEDs of the remaining portion having a light emission surface on which the intermediate fluorescent unit is not positioned.

10. The mobile terminal of claim 8, wherein the fluorescent unit further comprises a plurality of light transmissive hollow pipe members with at least one red quantum dot of the plurality of red quantum dots contained in each of the light transmissive hollow pipe members.

11. The mobile terminal of claim 10,
wherein a light provided from at least the light emission surface of each of the plurality of light source units or a light output surface of the fluorescent unit is incident on a lateral side of the light guide plate.

12. The mobile terminal of claim 10, wherein at least the fluorescent unit or the plurality of intermediate fluorescent units are positioned on a light emission surface of at least a portion of the blue LEDs of the plurality of blue LEDs.

13. The mobile terminal of claim 10, wherein:
each of the plurality of intermediate fluorescent units is positioned on a portion of a light emission surface of each of the plurality of blue LEDs; and
each of the plurality of light transmissive hollow pipe members is positioned on a light output surface of each of the plurality of intermediate fluorescent units.

14. The mobile terminal of claim 8,
wherein a light provided from at least a light emission surface of each of the plurality of light source units or a light output surface of the fluorescent unit is incident on a lateral side of the light guide plate.

\* \* \* \* \*